W. E. COPITHORN.
DETACHABLE RIM FOR PNEUMATIC TIRES.
APPLICATION FILED JUNE 20, 1910.
1,013,374.
Patented Jan. 2, 1912.
2 SHEETS—SHEET 1.
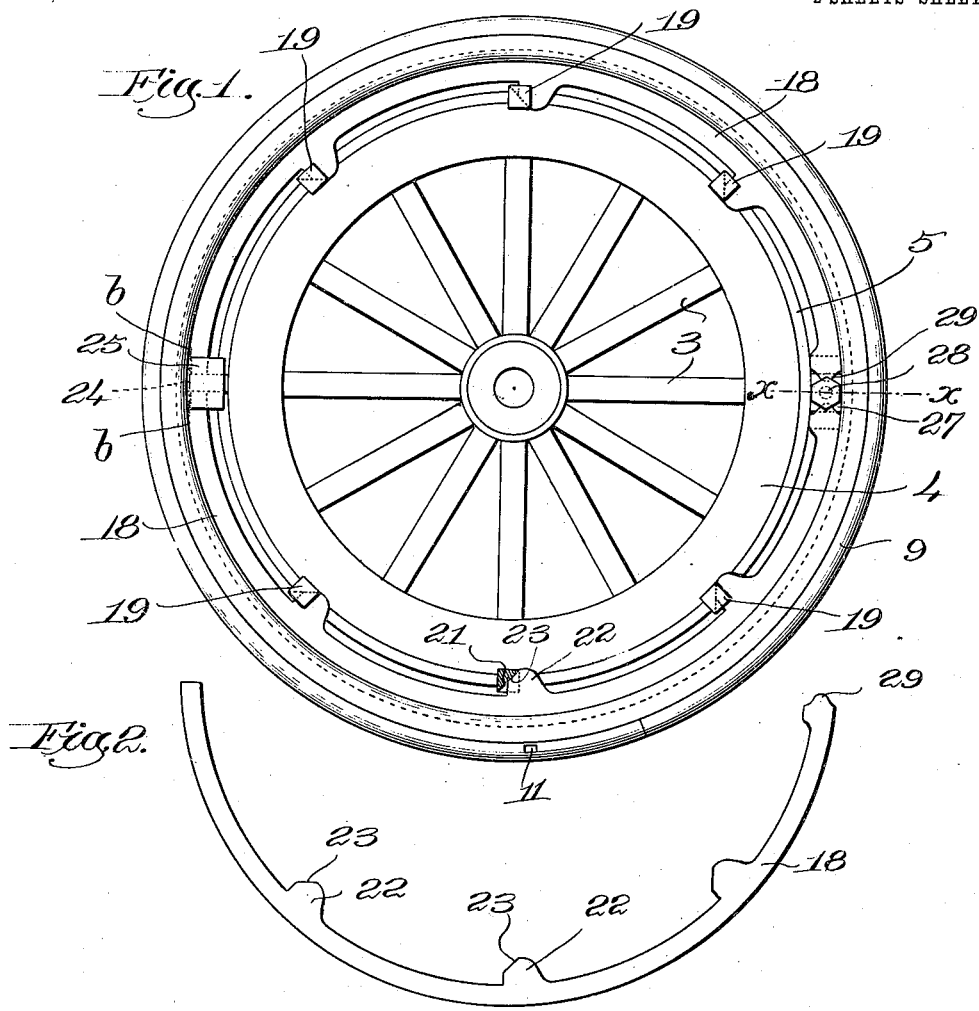
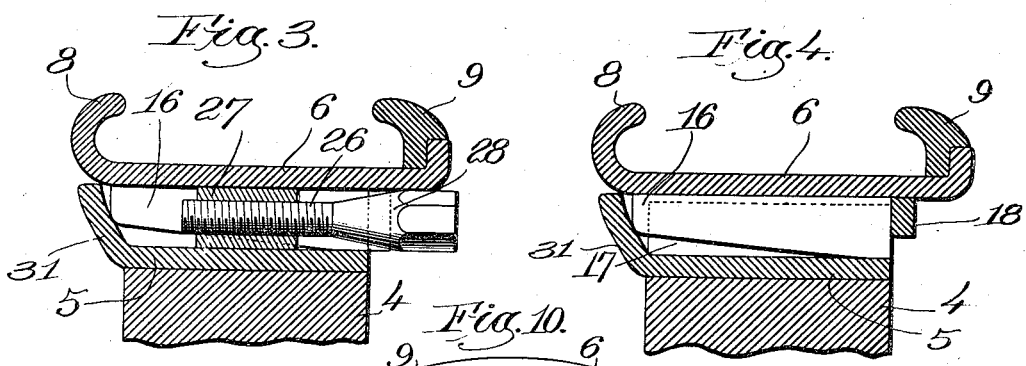

W. E. COPITHORN.
DETACHABLE RIM FOR PNEUMATIC TIRES.
APPLICATION FILED JUNE 20, 1910.
1,013,374. Patented Jan. 2, 1912.
2 SHEETS—SHEET 2.
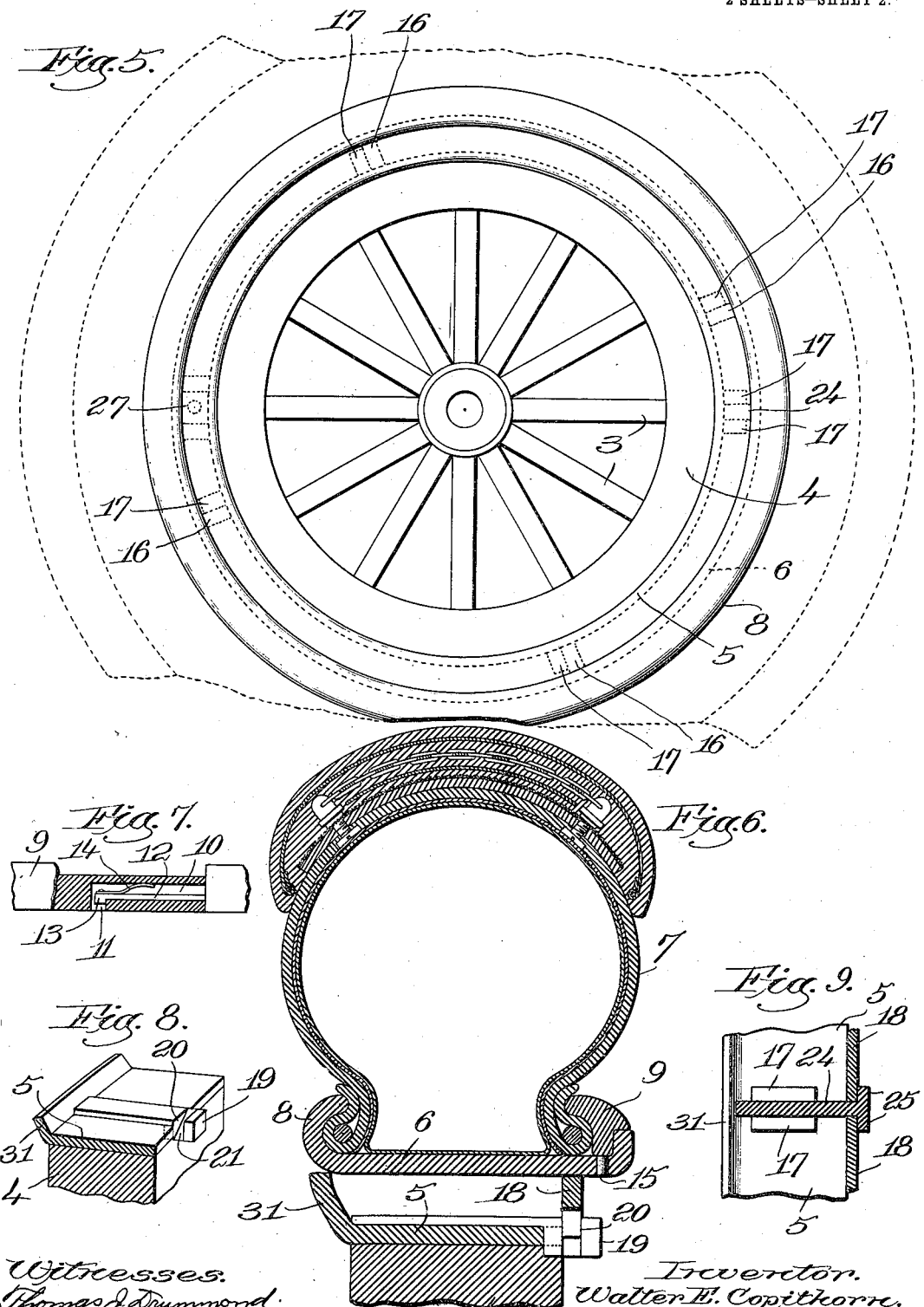

UNITED STATES PATENT OFFICE.

WALTER E. COPITHORN, OF NATICK, MASSACHUSETTS.

DETACHABLE RIM FOR PNEUMATIC TIRES.

1,013,374.     Specification of Letters Patent.     Patented Jan. 2, 1912.

Application filed June 20, 1910. Serial No. 567,779.

*To all whom it may concern:*

Be it known that I, WALTER E. COPITHORN, a citizen of the United States, residing at Natick, county of Middlesex, and State of Massachusetts, have invented an Improvement in Detachable Rims for Pneumatic Tires, of which the following description, in connection with the accompanying drawing, is a specification, like characters on the drawing representing like parts.

This invention relates to demountable or detachable rims for pneumatic and other tires, and has for its object to provide a simple locking device for securing the detachable rim to the wheel body, which locking device can be very quickly and readily placed and locked in operative position or released, and which will rigidly and firmly hold the detachable rim in place.

The features wherein my invention resides will be more fully hereinafter described and then pointed out in the appended claims.

In the drawings, Figure 1 is a side view of a wheel having thereon a detachable rim embodying my invention; Fig. 2 is a view of one of the locking members for holding the detachable rim in place; Fig. 3 is an enlarged section on substantially the line $x$—$x$, Fig. 1; Fig. 4 is an enlarged section taken transversely of the rim at some point between the locking projections; Fig. 5 is a side view of the wheel showing an opposite side from that shown in Fig. 1; Fig. 6 is an enlarged sectional view of the tire and rim; Fig. 7 is a detail view showing the manner of connecting the ends of the locking ring 9; Fig. 8 is a detail perspective view of a portion of the wheel rim; Fig. 9 is a sectional view taken immediately under the detachable rim 6 and showing the fixed rim 5 in plan and the projections 25 in section; and Fig. 10 is a detail view showing a modified form of the invention.

In the drawings 3 designates a wheel of any suitable construction having as part thereof the usual wooden felly and felly band or fixed rim 5.

The detachable rim is shown at 6 and in the embodiment illustrated it is constructed to receive and coöperate with a tire 7 of the clencher variety. Any suitable tire of the clencher variety may be used, but that shown in Fig. 6 is similar to the tire illustrated and described in my co-pending application Se. No. 548315, filed March 9, 1910. The detachable rim 6 is provided at one side with the clencher flange 8 and at the other side with the removable locking ring 9. Said flange 8 and ring 9 serve to grip the edges of the tire in a well-known way. The locking ring 9 is a split ring and when in operative position the ends are locked together by the locking device shown in Fig. 7. One end of the ring is provided with the longitudinal bore 10 which is intersected by a lateral aperture 11. The other end of the ring is provided with a locking finger 12 having a nose 13. The finger 12 will be inserted into the bore 10 until the nose 13 enters the aperture 11, as seen in Fig. 7, thus locking the two ends of the ring together. The finger 12 is provided with a spring 14 which will automatically throw the nose 13 into the aperture 11. The ring can be unlocked when it is desired to remove it by inserting a suitable implement in the aperture 11 to disengage the nose 13 from the wall of the aperture. The ring 9 will preferably be provided with one or more projections 15 which enter apertures in the detachable rim 6 and thus prevent any creeping of the locking ring on the rim.

The detachable rim 6 is removable laterally from the wheel body as usual, and when in position it engages a flange or rib 31 formed on the fixed rim, which flange or rim prevents lateral movement of the detachable rim in one direction. Said detachable rim is provided on its inner face with one or more lugs or projections 16 which are adapted to engage other projections 17 extending outwardly from the fixed rim or felly band, the engagement of such projections serving to prevent the tire rim from creeping. In the embodiment of the invention herein shown said tire rim 6 is held in position on the wheel body and in engagement with the flange or rib 31 by means of a locking member which has locking engagement with a plurality of locking projections carried by the wheel body. These projections are shown at 19 and are illustrated as being secured to the fixed rim 5, but it would be within my invention to sustain said projections in any suitable way. The locking member is shown at 18, and in the particular embodiment illustrated it is an expansible member comprising two semi-circular sections which are adapted to engage both the tire rim 6 and the locking projections 19. Each locking projection 19 is formed with an outwardly-directed lip behind which the locking member is received, and in the construction shown these lips are formed by making each projection with a groove 20 so that the outer wall of the groove constitutes the lip. The portions 22 of the locking member which fit behind the lips of the locking projections are preferably provided with inclined faces 23 which are adapted to ride up on the projections as the locking member is expanded, as will be presently described. I have herein shown the grooves 20 in which the portions 22 of the locking member are received as provided with inclined faces 21 to co-act with the inclined surfaces 23. The fixed rim is also provided with a projection 24 having two flanges 25 extending therefrom behind which the ends of the sections of the locking member 18 may be placed. These locking member sections when in position lie inside of the detachable rim 6 and lie against the ends of the projections 16 extending therefrom. The ends of the locking member sections 18 opposite to those which are received behind the flanges 25 are engaged by a locking screw 26 which operates to force them apart and thus lock the detachable rim firmly to the wheel.

In assembling the parts the detachable rim is slipped in position over the wheel with the lugs 16, 17 in engagement and then the two locking member sections 18 are placed in position with the adjacent ends thereof behind the flanges 25 and the projections 22 occupying the grooves 20. The locking screw 26 is then inserted between the opposite ends of the locking member sections and is screwed into a projection 27 secured to the tire. The locking screw is provided with a conical portion 28 which by engagement with the ends of the locking member spreads them apart, thus forcing the inclined faces 23 thereof outwardly on the inclined bottoms 21 of the grooves and expanding the locking members so that it will firmly engage the under side of the detachable rim 6.

The locking member is held in position by its engagement with the outwardly-projecting lips on the locking member 19 and the detachable rim 6 is held from movement laterally by the engagement of the projections 16 with the locking member. The removal of the detachable rim from the wheel involves merely the removal of the locking screw 26 and the locking member 18, an operation which can be very quickly performed. Instead of screwing the locking screw 26 into a lug 27 on the exterior of the fixed rim 5, I may screw this into the felly 4 of the wheel, in which case the locking member would have the construction shown in Fig. 10, that is, it would be provided with the fingers 29 properly situated to be engaged by the screw when the latter is screwed into the felly 4. In this embodiment of my invention the ends of the locking member 18 are arranged to overlap each other, as shown at 30.

The fixed rim 5 is provided with the inclined flange 31 on the side opposite to that on which the locking projections 19 are located, and this flange is adapted to have engagement with the ends of the projections 16 and is for the purpose of preventing lateral movement of the detachable rim 6 toward the left in Fig. 4.

From the above it will be seen that my improved locking device comprises a sectional locking member which has interlocking engagement with lips formed on lugs extending laterally from the wheel body and that said locking member is expanded outwardly into engagement with the detachable rim and by its engagement with the lugs serves to hold the detachable rim firmly in place.

Various changes in the constructional details of the parts may be made without departing from the invention.

Having fully described my invention, what I claim as new and desire to secure by Letters Patent is:—

1. In a wheel, the combination with a wheel body, of a detachable tire-receiving rim, a circular expansible locking member for locking the detachable rim to the wheel body, and a single tapered screw screw-threaded into and extending transversely of the wheel body and co-acting with the locking member to expand it and thereby lock the rim in place.

2. In a wheel, the combination with a wheel body having associated therewith fixed inclined surfaces and a wall or lip adjacent each surface, of a detachable rim, an expansible locking member situated on the interior of the detachable rim and provided with inclined surfaces to engage those associated with the wheel body, and means to expand the locking member, said lips overlying the front face of the locking member and holding it in position.

3. In a wheel, the combination with a wheel body having associated therewith locking projections provided with grooves, of a detachable rim having a projection on its inner face, and a locking member situated inside of said rim and engaging said projection thereon and also having projections with inclined faces that occupy said grooves, and a screw secured to the wheel body and acting to expand the locking member.

4. In a wheel, the combination with a wheel body of projections on its exterior, locking projections provided with grooves and extending laterally therefrom, a detachable tire-receiving rim having projections on its interior surface coöperating with the projections on the wheel body to prevent creeping of the rim, a two-part locking member provided with inclined faces adapted to occupy the grooves, and a screw to force the sections of the locking member apart thereby to cause the inclined surfaces thereon to act on the bottoms of the grooves and expand the locking member outwardly.

5. In a wheel, the combination with a wheel body, of projections on its exterior, locking projections extending laterally therefrom and each having an outwardly-projecting lip at its end, a detachable tire-receiving rim encircling the wheel body and having an interior diameter larger than the exterior diameter of said wheel body, said detachable rim having projections on its interior face to coöperate with those on the wheel body thereby to prevent creeping, and a detachable annular locking member encircling said locking projections and having portions adapted to lie behind said lips, said member being shaped to engage and press outwardly against the inner face of the detachable rim to hold the latter centered relative to the wheel body.

6. In a wheel, the combination with a wheel body, of locking projections extending laterally therefrom and each having an outwardly-projecting lip at its end, a detachable rim encircling said wheel body, means to prevent lateral displacement of said rim, and a detachable annular locking member encircling said projections and having inwardly-directed portions which lie behind the lips and have bevel faces to engage said projections, said locking member being shaped to engage and press outwardly against the inner face of the detachable rim to hold the latter centered.

7. In a wheel, the combination with a wheel body, of locking projections extending laterally therefrom and each having an outwardly-projecting lip at its end, a detachable tire receiving rim encircling the wheel body, means to prevent lateral displacement of said tire-receiving rim in one direction, a sectional detachable expansible locking member encircling said projections and having inwardly-extending portions which lie behind the lips and have bevel faces to engage said projections, and means to expand said locking member thereby to cause it to press outwardly against the inner face of the tire-receiving rim.

In testimony whereof, I have signed my name to this specification, in the presence of two subscribing witnesses.

WALTER E. COPITHORN.

Witnesses:
BERTHA F. HEUSER,
THOMAS J. DRUMMOND.